INVENTORS F. K. BECKER
L. N. HOLZMAN
BY
Charles Scott Phelan
ATTORNEY

April 15, 1969 F. K. BECKER ET AL 3,439,275

DEMODULATOR LOCAL FREQUENCY PHASE CONTROL CIRCUITS

Filed May 28, 1965

3,439,275
DEMODULATOR LOCAL FREQUENCY PHASE CONTROL CIRCUITS

Floyd K. Becker, Colts Neck, and Louis N. Holzman, Lincroft, N.J., assignors to Bell Telephone Laboratories, Incorporated, New York, N.Y., a corporation of New York Filed May 28, 1965, Ser. No. 459,555
Int. Cl. H04b *1/68;* H03c *1/52*
U.S. Cl. 325—329 21 Claims

ABSTRACT OF THE DISCLOSURE

A phase locked oscillator is described in which an in phase and a quadrature carrier signal are provided by a voltage controlled oscillator. A received data signal is homodyne demodulated employing each of these locally generated carrier signals. The output signals from the demodulators are employed to generate a control signal which is applied to the voltage controlled oscillator. A circuit is included which disables changes in the control signal if the received data signal falls below a predetermined amplitude. An error detection circuit introduces a 18° phase shift if the error rate exceeds a predetermined minimum.

This invention relates to a demodulator circuit and, more particularly it relates to a demodulator with provision for automatically adjusting the phase of the carrier frequency wave with respect to a modulated data wave for the demodulation function.

High speed data transmission systems require precise automatic phase control of the carrier frequency wave which is used for data demodulation in the system receiving terminal. The copending application of F. K. Becker Ser. No. 459,659 filed May 28, 1965, and entitled, "Suppressed Carrier Transmission System for Multilevel Amplitude Modulated Data Signals," teaches a multilevel data transmission system in which amplitude modulated signals are transmitted on a vestigial sideband basis and wherein a demodulator of the type presented herein is advantageously utilized. The mentioned Becker transmission system application also teaches some of the difficulties involved in detecting accurately information which is transmitted in a multilevel format at high speeds. For such an operation precise phase control of the recovered carrier frequency is an essential, and it is further necessary that there be no ambiguity as to whether the recovered carrier is locked-in in the correct phase relationship or in a 180-degree condition with respect to the correct relationship.

It is, therefore, one object of the present invention to improve phase control arrangements in demodulators for carrier frequency waves applied thereto.

It is another object to minimize the opportunity for the generation of an ambiguous phase lock-up condition.

A further object is to reduce the effects of phase jitter in demodulation circuits.

These and other objects of the invention are realized in an illustrative embodiment thereof in which certain low frequency portions of demodulator output signals, which are indicative of phase mismatch between the modulated signal and the applied carrier frequency wave, are extracted. Such demodulator output portions are utilized to generate a control signal which is employed for adjusting the phase of the locally derived carrier. In one embodiment the mentioned low frequency portions are any direct-current components in the signal at the demodulator output and any low frequency alternating-current components which are substantially below the carrier frequency.

It is one feature of the invention that a first demodulator is utilized to produce the desired information signal and is supplemented by a second demodulator of similar type which is driven by a quadrature carrier. The low frequency components in the outputs of both demodulators are producted together to produce a control signal.

Another feature is that the magnitude and polarity of the low frequency components are separately evaluated to control the intervals during which carrier phase is supervised and to control the direction of any resulting change made in the carrier phase, respectively.

A further feature is that during intervals of carrier phase supervision the phase relationship between the carrier and the incoming signal is continuously adjusted as long as the modulated input signal contains the mentioned frequency components which correspond to low frequency components in the demodulator output in excess of a predetermined minimum significant amount.

An additional feature is that an in-phase demodulator and a quadrature demodulator supply their output signals through low-pass filter means to a productor which is utilized in the generation of a phase adjusting control signal. Additional control circuits are provided for eliminating any ambiguity in the resulting carrier phase relationship with the signal in the in-phase demodulator.

A more complete understanding of the present invention may be obtained from a consideration of the following detailed description in connection with the appended claims and the attached drawing in which:

Figure 1:
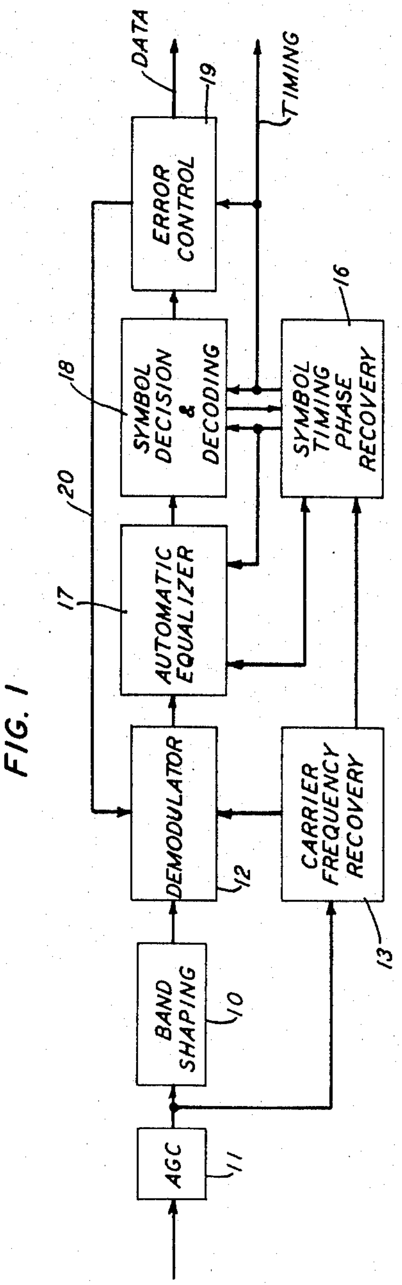
FIG. 1 is a simplified block and line diagram of a data system receiving terminal utilizing the present invention.
Figure 2A:
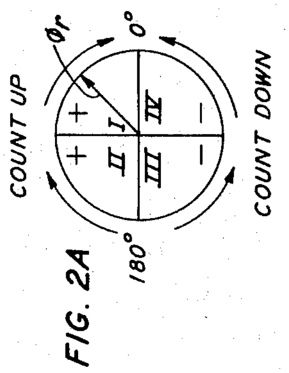
FIGS. 2A and 2B are circle phase diagrams for the circuit of FIG. 2.
Figure 2B:
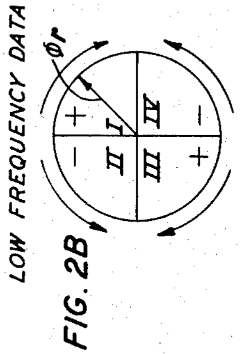
Figure 2:
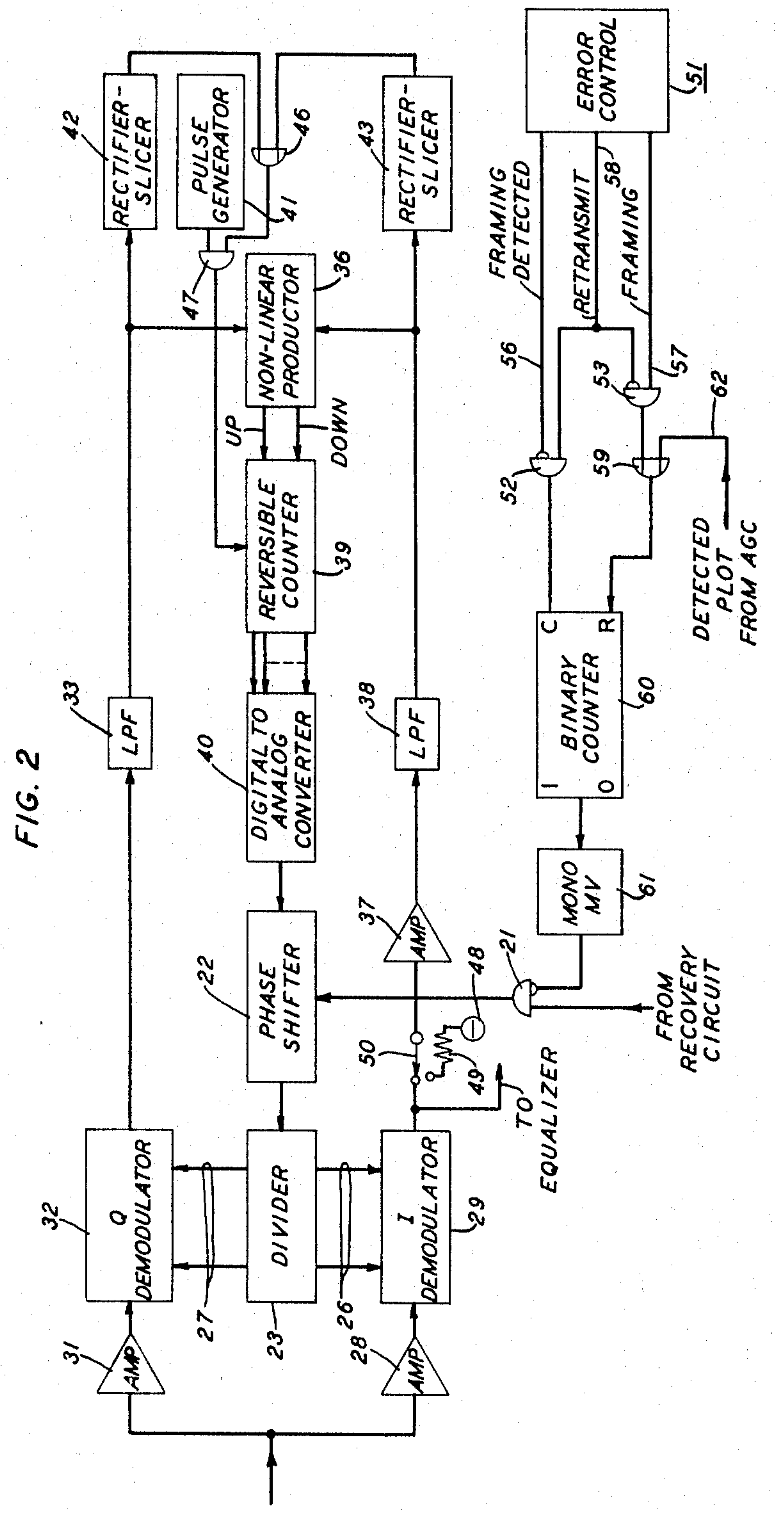
FIG. 2 is a simplified block and line diagram of a demodulator in accordance with the present invention.
Figure 6:
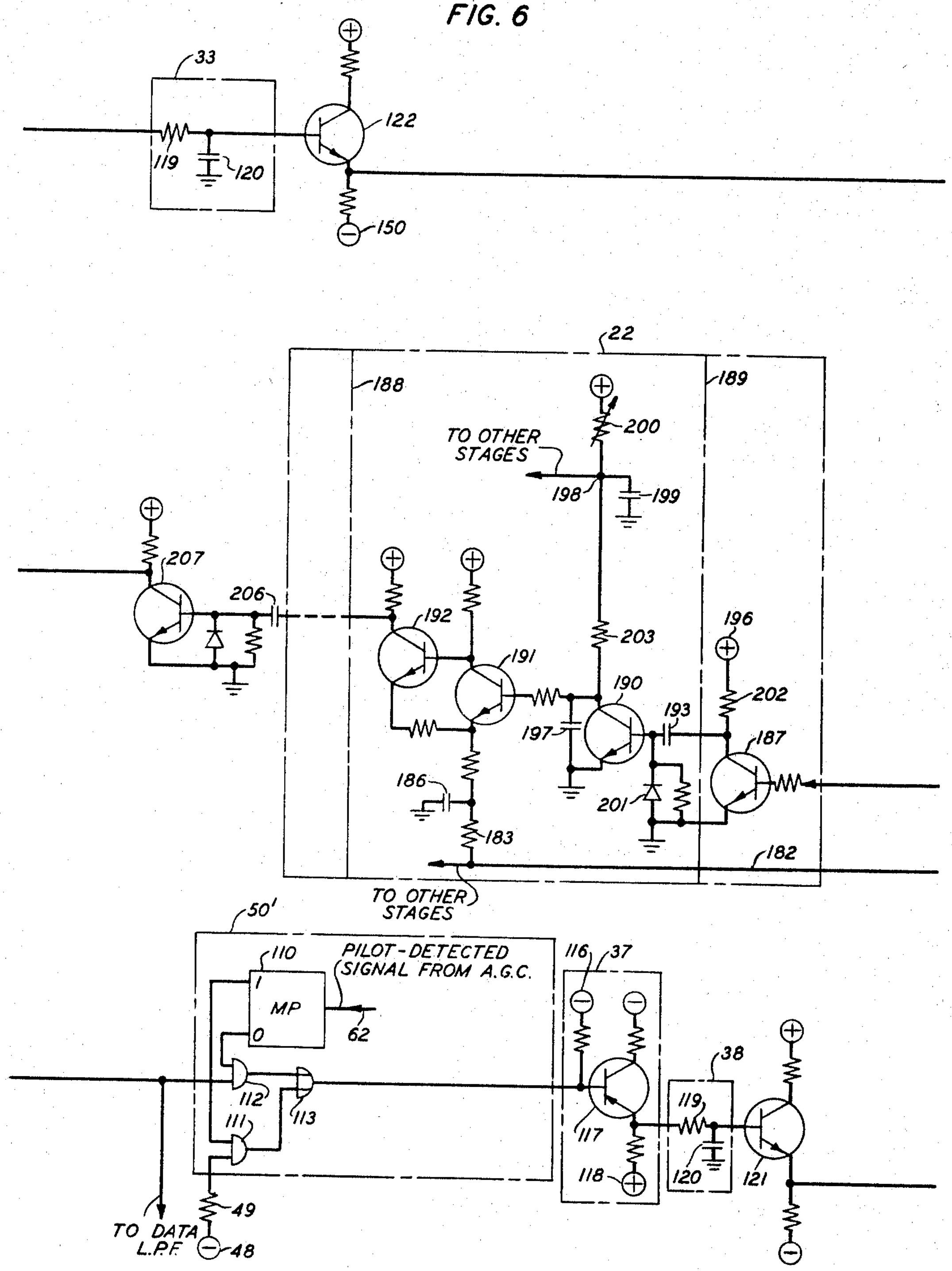

FIGS. 1 and 2 are similar to the FIGS. 1 and 6, respectively, of the aforementioned Becker transmission system application and they illustrate one type of system in which the demodulator of the present invention is useful. In FIG. 1 a band-shaping filter 10 provides spectrum limiting filtering which supplements similar filtering provided in a transmitting terminal, not shown, to achieve a raised cosine signal spectrum at the illustrated demodulator input. These input signals are advantageously multilevel-coded data signals that amplitude modulate a carrier frequency wave having a frequency advantageously selected according to the characteristic of the transmission medium. In the illustrated embodiment the carrier frequency was equal to the symbol rate but this is not essential to the operation of the invention. The modulated signals are transmitted by a vestigial sideband transmission system. The carrier frequency is suppressed in the modulator and must be regenerated in the receiving terminal for demodulation purposes. Pilot tones are transmitted along with the data signal, as is known in the art.

Each train of transmitted information signals is preceded by an initialization period which is utilized to prepare receiving terminal circuits for subsequent data transmission. For example, an interval of steady carrier and pilots is sent for initializing phase recovery circuits such as those to be described herein. In addition, a series of standard pulses is transmitted for initializing an automatic equalizer; and an interval of data framing pulses is transmitted for initially synchronizing error control circuits.

Since the multilevel data information coding utilizes both positive and negative amplitude levels, the transmitted signal will evidence a carrier phase inversion each time successive signal symbols have code levels of different polarities. However, the demodulator of the present invention is not caused to lose phase synchronization by such occurrences, as will be hereinafter discussed.

An automatic gain control circuit 11 stabilizes signal amplitude levels prior to the application of the signals to a band-shaping filter 10. Pilot frequencies received along with the incoming signal are utilized in a carrier frequency recovery circuit 13 for providing particular carrier harmonics to the demodulator 12 and to a symbol timing wave phase recovery circuit 16. The latter circuit adjusts the phase of the recovered timing wave to an optimum condition for utilization in an automatic equalizer 17 and a symbol decision and decoding circuit 18. The latter circuit extracts the digital data information from the equalized and demodulated multilevel signals and applies such data to an error control circuit 19. The latter circuit advantageously corrects a limited number of errors which may occur in the decoded signal and detects almost all errors in excess of that number. If excessive errors are detected, a signal is sent back to the tarnsmitting terminal requesting a retransmission, as is well known in the art. However, in accordance with the present invention, the error control circuit 19 also supplies certain signals on a circuit 20 to the demodulator 12 to indicate that massive errors have occurred and a test phase reversal of the demodulator carrier should be accomplished.

FIG. 2 includes a block and line diagram of the demodulator 12 of FIG. 1. The demodulator circuit in FIG. 2 receives the modulated multilevel data signal from the output of the automatic gain control circuit 11. The demodulator also receives a carrier frequency harmonic which is advantageously 9600 cycles per second for a signal with a symbol rate and a carrier frequency of 2400 cycles per second. The carrier recovery circuit 13 in FIG. 1. supplies the 9600 c.p.s. harmonic signal. This carrier harmonic is coupled through a coincidence gate 21 to the input of a phase shifter 22. The phase shifter controls the phase of the recovered carrier signal in relation to the incoming data signal in a manner which will be hereinafter described. The 9600 c.p.s. signal from the phase shifter 22 is applied to a frequency divider and phase shifter circuit 23 which provides a first two-rail output at the carrier frequency of 2400 c.p.s. on the leads 26 which are herein considered the in-phase carrier signal leads. The divider also provides on a pair of leads 27 another carrier frequency signal of the same frequency but in quadrature phase relationship thereto. Divider 23 is a re-entrant shift register which holds the quadrature phase relationship between the two derived carrier frequency waves exactly. In addition, the divider is characterized by producing such waves in precise symmetrical waveforms so that each positive-going half-cycle is exactly the same as each negative-going half-cycle in duration. It is essential that the carrier wave be symmetrical in order that the carrier frequency signal should not inject any undesired signal components into a demodulator output as is well understood in the art.

The modulated data from the automatic gain control circuit 11 is applied through an isolation amplifier 28 to the input of an I demodulator 29. This demodulator receives the recovered carrier frequency wave on the circuit 26, and that carrier must be adjusted to be in phase with the data signal. The output of demodulator 29 is coupled to the input of the adjustable equalizer 17 in FIG. 1. The output of the band-shaping filter 10 is also coupled through another amplifier 31 to the input of a Q demodulator 32. The two demodulators 29 and 32 are balanced modulators operated under the control of rectangular wave, carrier frequency signals to function as switch demodulators in a manner which is known in the art. The low frequency energy components in the outputs of both of the demodulators 29 and 32 are utilized to control the phase of the carrier harmonic by providing a control signal to the phase shifter 22.

In a suppressed carrier transmission system, the data signal normally does not include the carrier frequency component. However, there are in the random data signal wave occasional intervals when successive symbols have the same or similar magnitudes, and this causes the inphase demodulator output to have a direct-current component if they are the same amplitude or some very low frequency components for similar amplitudes. The output of the inphase demodulator also includes a strong direct-current component when receiving only carrier as a line signal. This assumes, of course, that the locally recovered carrier is properly phased with respect to the data signal.

On the other hand, the Q demodulator 32 under the same conditions of properly phased local carrier presents essentially no output for either carrier or data with successive similar symbols. Being a quadrature demodulator it produces no output unless there is a phase discrepancy between the carrier and the data.

If carrier frequency is present in the line signal input to the demodulators, but not precisely in phase with respect to the local carrier, then both of the demodulators produce an output direct-current component. A similar situation results if data is being received and is out of phase with respect to the local carrier when the data includes very low frequencies. All of the previously described demodulator signal relationships are hereinafter utilized in the circuits to be described for controlling the phase of the recovered carrier for demodulation purposes.

A low-pass filter 33 couples the output of the quadrature demodulator 32 to one input of a nonlinear productor 36. An additional isolation amplifier 37 and another low-pass filter 38 couple the output of the in-phase demodulator 29 to a second input of the nonlinear productor 36. The low-pass filters 33 and 38 are adapted to pass direct current and also the adjacent low frequencies which can be produced in the demodulator outputs in response to data symbol sequences which are of similar amplitude, i.e. which vary from symbol to symbol through only a relatively small number of adjacent information-determinant amplitude levels. Thus, the filters 33 and 38 advantageously have a cutoff frequency in the illustrative embodiment of about 25 cycles per second. In a vestigial sideband system the cutoff frequency could go as high as one-fourth of the symbol rate where a raised cosine line signal spectrum is used.

Productor 36 is a logical EXCLUSIVE OR type of circuit which responds to the polarities of its two input signals for producing one or the other of two output signals. The inputs may be either alternating current or direct current. If the input signal polarities to the nonlinear productor are the same, the productor produces an output which is applied to a two-rail circuit including leads UP and DN, and the signal is ground on UP and negative on DN. The leads UP and DN are applied to the counting direction control input of a reversible binary counter 39. Similarly, if the two input signals to the productor 36 have different polarities, the productor provides a two-rail signal that makes lead UP negative and lead DN ground. The former condition causes the counter to count in one direction, and the latter condition causes the counter 39 to count in the opposite direction. Outputs from counter 39 are coupled by a digital-to-analog converter 40 which develops a control signal for phase shifter 22.

Because of the polarity type of response of the nonlinear productor 36, it produces one type of output to indicate a leading phase relationship and another to indicate a lagging phase relationship. The two types of productor signal are always the same even though the incoming data signal may itself reflect inherent carrier phase reversal conditions which appear in the transmitter each time an information-determinant amplitude is selected which has a polarity that is opposite from the immediately preceding information-determinant amplitude polarity. That is because such transmitted phase reversals switch both input signal polarities to the productor at the same time.

Drive pulses for the reversible counter 39 are supplied from a pulse generator 41 under the control of the output signals from the two low-pass filters 33 and 38. The pulse rate from generator 41 is low compared to the data symbol rate. Two rectifier-slicer circuits 42 and 43 couple the outputs of the low-pass filters to an OR gate 46. Signals supplied from the low-pass filters 33 and 38 must attain a predetermined minimum magnitude before either of circuits 42 or 43 is able to couple them through the OR gate 46 for enabling an AND gate 47.

When enabled, the gate 47 couples each output pulse from the pulse generator 41 to the input of reversible counter 39 for operating that counter in the direction indicated by the control signals from the nonlinear productor 36 as previously described. Consequently, counter 39 is driven at any time that the demodulator input includes carrier frequency signals or a train of data symbols with relatively small amplitude changes.

Counter 39 is operated whenever the low-pass filter outputs, or either of them, has at least a predetermined minimum amplitude, and the manner of operation of the reversible counter is a function of the relative polarities of the outputs of those two low-pass filters. After any particular operation the counter 39 remains in its final condition and thus stores its last condition. Consequently, the adjustment of phase shifter 22 remains fixed between the times that the counter 39 is operated to supervise the phase condition once more.

Phase shifter 22 and counter 39 are advantageously arranged so that they have a total phase control range of more than 360 electrical degrees for the divided carier frequency signals which are produced on the circuit 26 and 27. In one embodiment actually operated, the control range was about 400 degrees. If the control range were only 360 degrees, and the input phase conditions dictated operation of the reversible counter around a condition corresponding to 360 electrical degrees of the carrier frequency, repeated large swings of the counter would occur. Each time such a counter operates between the extremes of its range a spurious carrier phase change occurs. For example, if counter 39 were required to be completely reset each time a 365-degree phase shift were indicated, there would be repeated intervals of incorrect phase.

However, with the 400-degree control range the counter 39 can operate as easily and rapidly back and forth around the 360-degree condition as it can around any other points. If further phase shift to the 400-degree level is indicated, the counter advances to the full count condition before beginning to hunt around the correct condition. When necessary, the counter spills over once to the reset condition, and it then advances to the equivalent 40-degree condition about which it oscillates as required without moving back and forth continuously between the counter extreme conditions.

During the start-up operation for the receiving terminal a negative reference voltage source 48 is connected by means of a current-limiting resistor 49 and a selector switch 50 to the input of the amplifier 37 in lieu of having the output of in-phase demodulator 29 connected to such amplifier. The source 48 is assigned a negative potential because that is the polarity of the average potential that normally appears in the output of I demodulator 29 when steady carrier is being received in proper phase during the aforementioned initialization interval. This condition can be seen by reference to the waveforms of FIG. 3 wherein the solid-line diagrams represent a proper phase condition. The steady line carrier and the in-phase recovered carrier cause the I demodulator 29 to produce a full wave rectified version of the carrier with negative-going excursions. The average value is negative and corresponds to the negative potential from source 48 which appears in the output of filter 38 as shown in FIG. 3.

Source 48 is connected by switch 50 during start-up operation in order to bias productor 36 in a way which forces it to effect phase lock-up in the correct relationship with the steady carrier on the line instead of the 180-degree relationship which is otherwise possible as will be hereinafter discussed in greater detail. The importance of avoiding the 180-degree condition can be seen by reference to FIG. 3 again. If the recovered carrier applied to the I demodulator were 180 degrees out of phase from the condition illustrated in FIG. 3, the resultant wave in the output of the I demodulator would be a full wave rectified signal with positive rectified wave excursions instead of the negative excursions illustrated in FIG. 3. Such a reversal in a voice transmission system would probably not be detected in the ultimate output of the receiving terminal. However, for a receiving terminal which handles data transmission, and in particular multilevel data transmissions of the type considered herein with both positive and negative code levels, the reversal accomplishes a reversal of the polarities of the information-determinant signal levels. Consequently, signal levels are jumbled, and the resulting data wave is converted into a train of meaningless pulses. The use of such start-up reference 48 avoids the initial improper lock-up condition. The manner of avoiding it during data reception will be described in connection with FIGS. 2, 2A, 2B, and 3.

Figure 3:
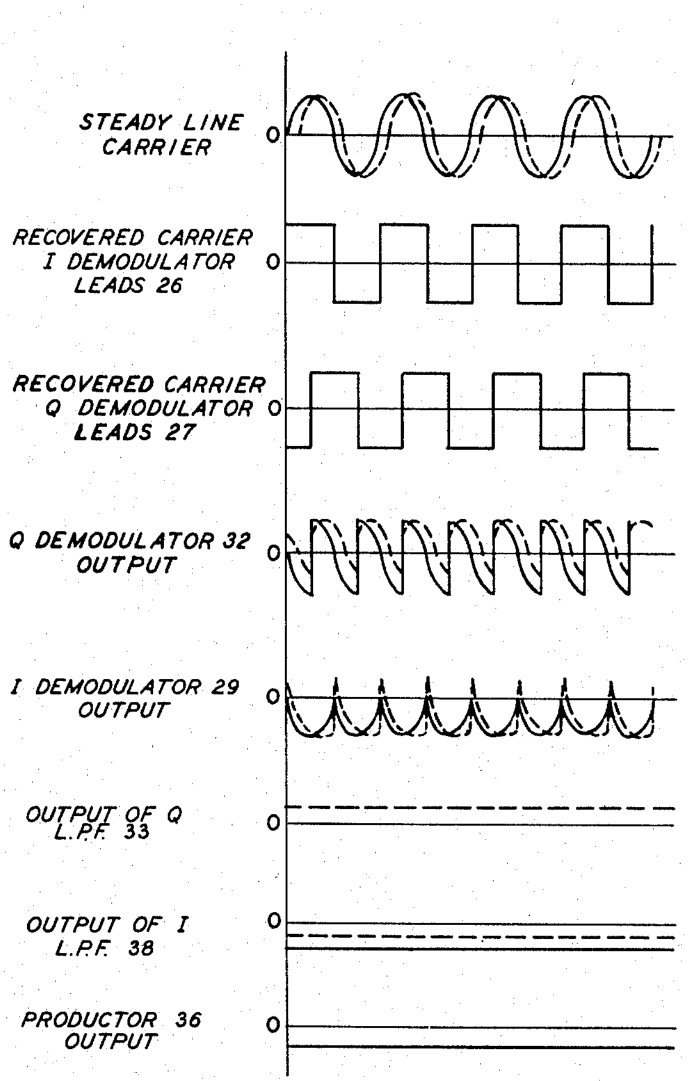
FIG. 3 is a set of timing diagrams illustrating one aspect of the operation of the demodulator in accordance with the invention.

It is seen in FIG. 3 that the two versions of the recovered carrier which are supplied by the divider 23 to the demodulators 29 and 32 are in 90-degree phase quadrature relationship. The output of the Q demodulator has substantially equal positive-going and negative-going portions so that the output of the Q low-pass filter for the in-phase carrier condition is zero. The I demodulator has an output train of substantially uniform negative-going signal excursions which would appear in the output of the I low-pass filter 38 as a negative direct-current voltage. The zero or ground voltage from filter 33, indicating a correct phase relationship, and the negative voltage from filter 38 cause productor 36 to produce an indeterminant, or hunting, output control voltage for driving counter 39 indicating a balanced condition for the phase control loop.

FIG. 2A is a phase error circle diagram that is divided into four quadrants. The polarity sign in each of the quadrants indicates the polarity of the output from productor 36. Such output is assumed to cause error angle vector rotation in the direction indicated by an arrow outside the quadrant. Thus, a positive output from the productor for phase angle errors in the two upper quadrants I and II causes the counter 39 to count up in order to rotate the phase error vector clockwise toward the zero-degree error position. Similarly, the productor has a negative output if the phase angle error vector lies in either of the two lower quadrants III and IV of the diagram in FIG. 2A and causes counter 39 to count down for rotating the error angle vector counterclockwise toward the zero-degree position. If the phase error angle is exactly 180 degrees, productor 36 may operate counter 39 either up or down.

The broken-line wave diagrams in FIG. 3 illustrate the condition in which the steady carrier received from the transmitting terminal as signal is out of phase with the recovered carrier locally generated in the receiving terminal. This shift in the relative phase between the received carrier and the recovered carrier represents a leading local carrier and causes the output of the Q demodulator 32 to have positive-going excursions of greater extent than the negative-going excursions for the illustrated condition. Consequently, the output of the Q low-pass filter 33 is positive. For this same phase error between the local and line carriers the output of the I demodultaor 29 now includes small positive-going cusps in addition to the negative-going wave portions. The average value of demodulator 29 output wave appears as a smaller negative direct-current voltage in the output of the I low-pass filter 38. The outputs of the two low-pass filters are thus of opposite polarity, productor 36 produces a positive output, and counter 39 counts up to shift the phase angle error vector in a clockwise direction toward the zero phase error condition. In other words, when counter 39 is counting up it is reducing a leading phase error in the local carrier.

In a similar fashion it will be understood that if the steady line carrier had a phase angle error $\varphi_r$ in the opposite direction from that illustrated in FIG. 3, the recovered carrier has a lagging phase relationship with respect to the line signal carrier applied to the I demodulator 29. The output of the Q demodulator 32 is shifted in a fashion which results in its negative-going excursions being of greater extent than its positive-going excursions so that the output of the filter 33 is negative. Under these conditions the output of the I demodulator 29 still has the positive-going cusps, but they do not cause a reversal in the polarity of the negative output voltage from the I low-pass filter 38. The outputs of both low-pass filters are, for the lagging phase error condition, of the same polarity. The productor 36 produces a negative output which causes counter 39 to count down and rotate the phase error angle in a counterclockwise direction toward the zero phase error condition.

The previously described condition of operation wherein the counter 39 counts up to reduce a leading local carrier phase error and counts down to reduce a lagging local carrier phase error also applies in much the same fashion for the reception of data. However, as previously noted, during the reception of data, which is in the supressed carrier form, there is normally no carrier component continuously present when the data is changing in a random fashion. When the data includes a succession of symbols at the same or adjacent amplitude levels, the signal does include short bursts of low frequency components which are below the cutoff frequencies of the filters 33 and 38. The demodulator is thereby caused to actuate counter 39 in the manner described in response to the control signals from productor 36 to shift the phase of the recovered carrier. If there is sufficient and discrepancy between the phases of the recovered carrier and the line signal to operate rectifier-slicer 42, the phase correction takes place continuously in one direction during such bursts. Otherwise the counter finds the correct condition and hunts about that condition in a very small phase angle range of about two steps of the counter as long as pulses are supplied from generator 41.

However, when data is being received there is one possible difference between the response of the demodulator to data and its response to steady carrier. When steady carrier is being received there is no alternating current present in the outputs of the low-pass filters 33 and 38, and productor 36 is responding to the polarities of two direct-current voltages. When data is being received, either with or without a phase angle error between the line signal and the recovered carrier, there are alternating-current components in the outputs of the two low-pass filters. Since such outputs are in phase with respect to one another as a result of the production of the quadrature carrier waves from the divider 23, the productor 36 is responding to sinusoidal functions at both inputs. The product of these two inputs can be shown to have a direct-current component proportional to the sine of two times the error angle.

A phase angle error jump such as might be caused by a shift of a carrier system transmission channel from one portion of a carrier spectrum to another could produce an actual error angle of 45 degrees or greater. Productor 36, because of its alternating-current response as a function of sine $2\varphi_r$, would respond to that occurrence as though the error angle were 90 degrees or greater. Similarly, if the phase error angle were at least equal to 90 degrees, the productor 36 would respond as though the error angle were at least equal to 180 degrees.

FIG. 2B illustrates the described type of productor operation, and the illustrated phase error angle is the actual phase error angle. However, the polarity signs in the circle diagram quadrants of FIG. 2B correspond to the reaction of the productor to twice the error angle in accordance with the manner in which such productor would react as described for the steady carrier case in FIG. 2A. Thus, in FIG. 2B an actual phase error angle falling in the quadrant II of the circle diagram would produce a reaction from productor 36 as though such angle were twice that size. That is, an error of 100 degrees causes the productor to react as though the error were 200 degrees, and in accordance with the diagram of FIG. 2A the productor would produce a negative output signal to cause counter 39 to count down. This is indicated by the minus sign in the second quadrant of the diagram in FIG. 2B. Similarly, an actual phase angle error which fell in the quadrant III of the circle diagram in FIG. 2B would in fact produce an output signal from productor 36 as though such error angle were in the quadrant I or II in FIG. 2A. Accordingly a positive sign is indicated in the third quadrant of FIG. 2B.

It is thus apparent that when data is being received an actual phase angle error of 90 degrees appears to productor 36 to be a phase angle error of 180 degrees; and, as shown in FIG. 2A, the productor may in that particular case cause counter 39 to count either up or down. This is illustrated in FIG. 2B wherein the arrows indicating the directions of operation of counter 39 and of error angle vector rotation are shown as going in opposite directions from either the 90-degree position or the 270-degree position corresponding thereto. The result of this condition is that the appearance of an actual phase angle error of 90 degrees may cause the counter 39 to bring about a local carrier phase shift to either the zero-degree lock-up condition or the 180-degree condition. In the 180-degree condition the output data from the receiving terminal would be garbled because of level inversion as hereinbefore noted.

It has been found that in practice the occurrence of phase angle errors of sufficient magnitude to push the phase adjusting circuitry of FIG. 2 into the uncertain quadrature position of FIG. 2B is extremely unlikely to occur. Generally carrier system channel shifting operations of the type hereinbefore mentioned do not produce error angles of such magnitude. Nevertheless, additional circuits provided in FIG. 2 are able to cope with the possibility of phase lock-up in the 180-degree phase condition during data transmission.

The massive errors resulting from operating at the 180-degree phase condition are handled with the aid of an error control circuit 51. Two coincidence gates 52 and 53 in FIG. 2 are each provided with an inhibiting, i.e., inverting, input connection and a regular input connection. Error control circuit 51 during normal operation produces a first output signal on a circuit 56 which initially inhibits gate 52. This inhibition is removed when error control circuit 51 has achieved framing synchronization with respect to incoming data framing pulses during the receiver initialization period as is known in the art. This framing detected signal on lead 56 and applied to the inhibiting input of gate 52 enables the gate during the rest of the transmission of data. Error control circuit 51 also produces an output on a circuit 57 which comprises the framing signals produced in error control circuit 51, and these signals are applied to enable the gate 53. Each time that the error control circuit 51 detects a sufficient number of errors to cause such circuits to send back to the data transmitting terminal, not shown, a request for retransmission of a word between successive framing pulses the error control circuit 51 also applies such signal on a circuit 58 to inhibit the gate 53 and operate the gate 52. The aforementioned signals on circuits 56, 57, and 58 are all available in error control circuits known in the art and circuits for deriving them are not shown.

During normal data transmission, when there are no errors or when the error occurrences are sufficiently few in number to permit the error control circuit 51 to correct them, gate 53 is not inhibited and the framing pulses from error control circuit 51 are coupled by the lead 57 through gate 53 and an OR gate 59 to reset a binary counter 60 which is arranged to count the output pulses from gate 52 appearing at the counter complementing input. If a large number of successive errors occur, such as when the demodulator phase is locked up on the 180-degree phase angle error condition, the retransmit pulses on circuit 58 advance the counter 60. The framing pulses are ineffective for resetting the counter because they occur at the same time as the retransmit pulses which inhibit gate 53. A train of successive retransmit signals on circuit 58 cause the counter 60 to count up to a predetermined level such as, for example, four retransmit signals. An output pulse is produced at the binary ONE output of the last counter stage to trigger a monostable multivibrator 61. The output of multivibrator 61 during its unstable condition of operation inhibits the gate 21 and thereby cuts off the supply of 9600 c.p.s. carrier harmonic to phase shifter 22.

The multivibrator 61 is adapted to have a period of unstable operation which is equal to the period of a 4800 c.p.s. wave. Consequently, two full cycles of the 9600 c.p.s. carrier harmonic wave are blocked from the phase shifter 22. When the multivibrator is restored to its stable condition the inhibition on gate 21 is removed, and carrier harmonic is once again supplied to phase shifter 22. However, the absence of two successive cycles in that waveform accomplishes a 180-degree phase shift in the divided carrier appearing in circuits 26 and 27 for the two demodulators 29 and 32. This is equivalent to a restoration of the zero-degree phase error angle condition.

A lead 62 is connected to the automatic gain control circuit 11 for applying an output control signal through the OR gate 59 to reset the counter 60 at the beginning of each training interval for the data transmission system to be certain that such counter is in the correct condition for detecting the 180-degree lock-up state. This control signal is arranged by any means known in the art to have a delayed dropout so that brief signal interruptions will not reset counter 60.

Figures 4, 8:
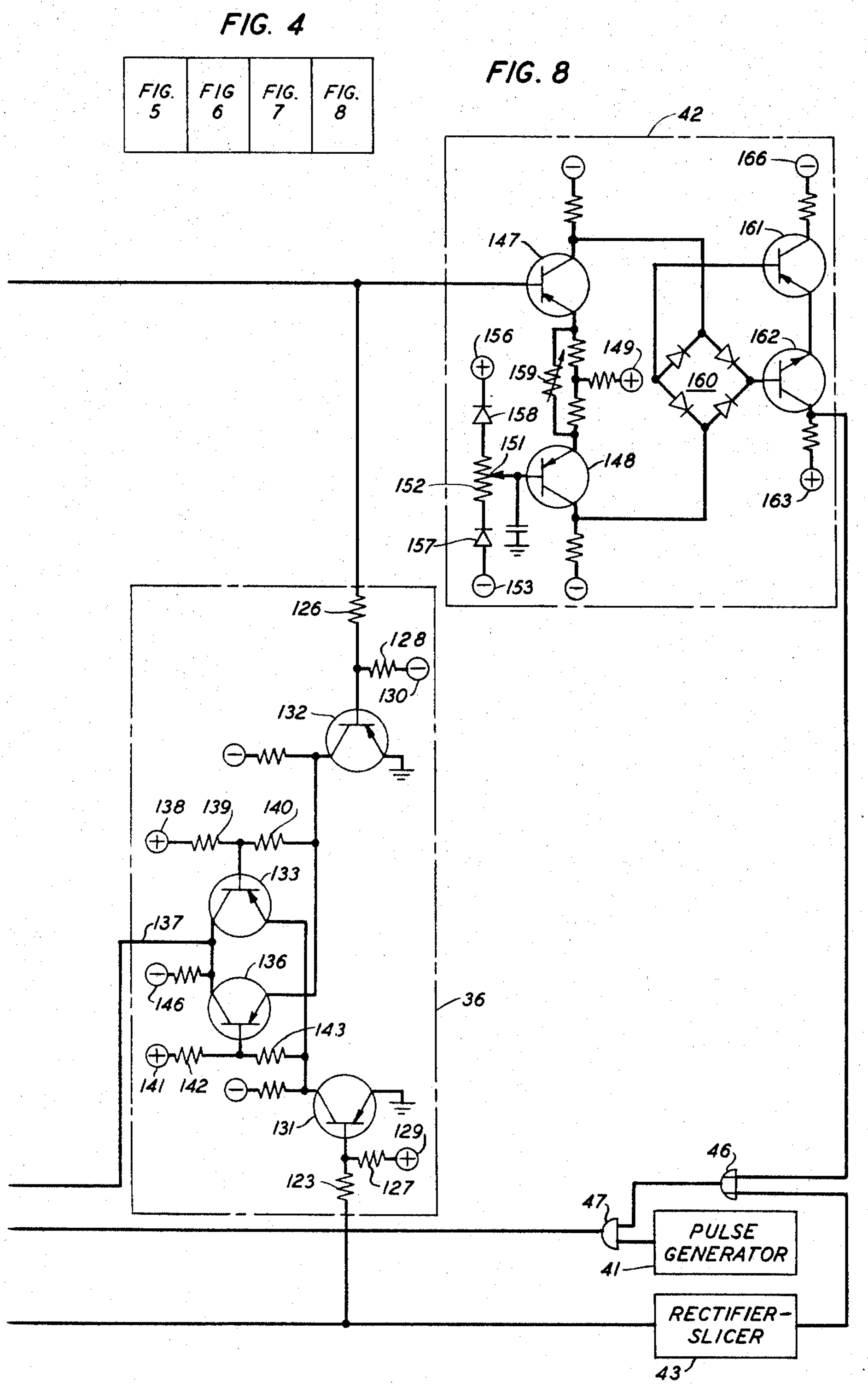
FIG. 4 is a diagram illustrating the manner in which FIGS. 5 through 8 may be combined to form a composite diagram, primarily in schematic form, of the demodulator in FIG. 2.

FIGS. 5 through 8 may be combined in the manner shown in FIG. 4 to form a composite detailed diagram of the demodulator of FIG. 2. The isolation amplifier 28 in the input to the in-phase demodulator 29 includes a transistor 66 which is arranged for linear common emitter operation. For this purpose it is biased to be normally conducting by means of a potential divider which includes two resistors 67 and 68 connected in series between a positive potential source 69 and a negative potential source 70. These sources are schematically represented by a circled polarity sign which indicates connection to a source of the proper polarity which has its terminal of opposite polarity connected to ground. A similar schematic representation is utilized throughout the drawings.

The isolation amplifier 31 which couples input signals to the Q demodulator 32 is shown as having a somewhat more elaborate format, since it is particularly designed to have a high input impedance so that its connection to the input circuit and to the input of the in-phase demodulator 29 does not disturb the operation of the latter demodulator. Thus, a transistor 71 is arranged in a further common emitter amplifier circuit, which is also adapted for linear operation by means of a potential divider including two series-connected resistors 72 and 73 which have a common circuit junction therebetween coupled by a resistor 76 to the base electrode of the transistor 71. Input signals to the amplifier are applied at the latter electrode. A capacitor 77 couples the emitter electrode of transistor 71 back to the same potential divider circuit junction to provide alternating-current feedback which causes the base and emitter electrodes of transistor 71 to appear at substantially the same alternating-current potential. Consequently, the circuit has a high input impedance and the shunting effect of the potential divider comprising resistors 72 and 73 is thereby reduced.

The output signal at the collector electrode of transistor 71 is applied to the base electrodes of two transistor 78 and 79 which comprise together an emitter follower type of circuit in which the transistor 79 comprises the emitter load resistance for the transistor 78. The transistor 79 also cooperates as such load resistance to provide an output signal which is relatively free of distortion injected by more conventional common emitter amplifiers.

The in-phase demodulator 29 and the quadrature demodulator 32 are balanced modulator types of circuits which are provided with a carrier signal having a rectangular waveform. Consequently, these demodulators operate in a switching demodulator mode. The two demodulator circuits 29 and 32 are equivalent, although they differ in some relatively minor respects insofar as the present invention is concerned. The in-phase demodulator has the modulated signal applied thereto across a primary winding 80 of a transformer 81. Winding 80 is connected in series in the emitter circuit of the isolation amplifier transistor 66. The secondary winding of transformer 81 includes two parts 82*a* and 82*b* which are connected in series through a potential divider 83. A tap 83*a* on the potential divider is connected through a resistor 86 to supply demodulated output signals to a data low-pass filter in the input of the equalizer 17.

The extremities of the secondary windings 82*a* and 82*b* are connected, respectively, to the collector electrodes of two transistors 87 and 88 which have their emitter electrodes connected together and to a terminal of positive potential on a potential divider including two series-connected resistors 89 and 90. The positive potential supplied to the emitter electrodes has only a small magnitude adapted to counteract the effect of junction offset voltages of opposite polarity in the transistors 87 and 88. Such offset voltages result from resistance in the transistor junctions even though such transistors are operating in their saturated conduction condition. The elimination of such effects reduces the amount of spurious demodulation products appearing in the demodulator output signal.

The tap 83*a* on the potential divider 83 is set for a fine balance condition to achieve a more precise center connection than is generally possible in tapping a transformer winding. A finely determined center connection is desirable so that the transformer secondary winding will be inductively balanced, and a minimum amount of the modulated line signal will be permitted to feed through the demodulator to its output. Since the demodulator is a product type of demodulator, it is desirable that the output should include primarily the product of the carrier and the line signals with minimum amounts of either of those signals being directly present. A capacitor 91 is connected between similarly poled terminals of the primary and secondary windings of transformer 81 in order to provide cancellation of a small amount of line signal which in some applications is capacitively coupled to the demodulator output through the transformer windings.

The base electrodes of transistors 87 and 88 are negatively biased by connection to negative potential sources 92 and 93. The same base electrodes are also connected through a pair of diodes 96 and 97, respectively, to two output connections of the re-entrant shift register circuit 23. The latter circuit includes two bistable multivibrators 98 and 99 which are arranged so that the outputs of each drive the inputs of the other, and so that both such circuits are also driven in multiple by the 9600 c.p.s. carrier harmonic which is supplied from the phase shifter 22. This type of operation causes the re-entrant shift register to produce a pair of output signal waves, one from each multivibrator, at the same frequency and in phase quadrature relationship with respect to one another. Thus, the use of the two-stage shift register with a 9600 c.p.s. input produces two 2400 c.p.s. output waves; and each such wave is, by virtue of the frequency dividing arrangement of the shift register, exactly symmetrical in that the positive-going excursion of each half-cycle is of precisely the same duration as the negative-going half-cycle thereof.

Figure 5:
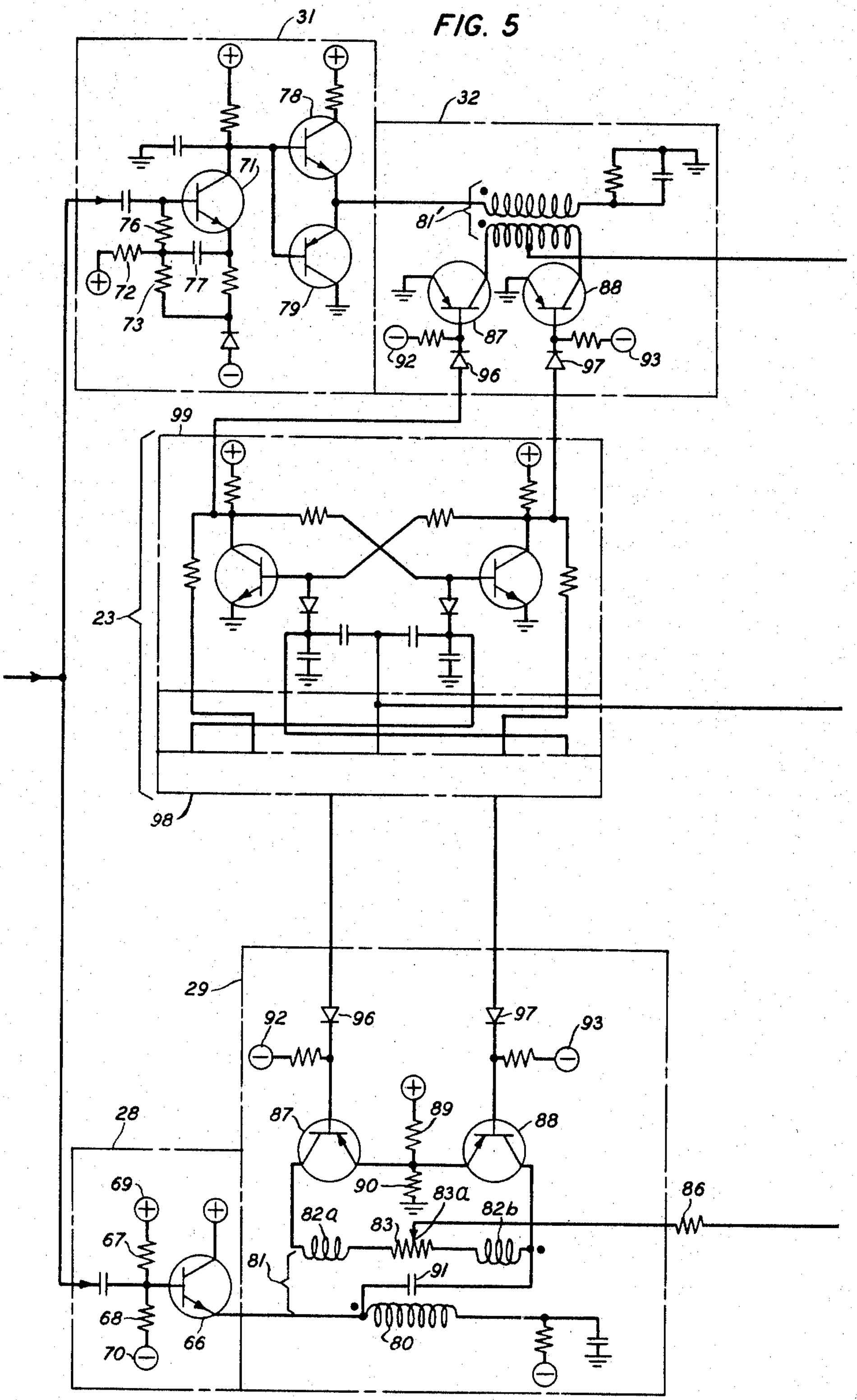

The details of multivibrator 99 are illustrated in FIG. 5, and it is apparent that the multivibrator is conventional with a complementing type of input connection such that each input pulse, whether it be applied from the phase shifter 22 or from the other multivibrator 98, causes the illustrated multivibrator to be triggered. The multivibrator 98 is the mirror image of the multivibrator 99 and the manner of interconnection of their input and output circuits to achieve the re-entrant shift register operation as is indicated.

It can be seen in FIG. 5 that the Q demodulator 32 is similar to the I demodulator 29 and corresponding circuit elements are indicated by the same, or similar, reference characters. In the Q demodulator 32 the transistors 87 and 88 have their emitter electrodes returned to ground instead of to a small positive voltage because the output of this demodulator is not utilized for decoding transmitted data signals and compensation for transistor offset voltage is accomplished in the productor 36 along with other compensation of the same type which is done in that circuit. Similarly, since the line signal frequency components in the output of the Q demodulator 32 are filtered out by the low-pass filter 33, prior to application to the productor 36, it is not necessary to provide a potentiometer 83 or a capacitor 91 in the Q demodulator to improve inductive and capacitive balance in the transformer 81'. It will be noted that the primary to secondary polarities of the transformers 81 and 81' in the two demodulators are different. This polarity difference schematically represents a polarity inversion imposed upon the I demodulator for one particular practical application thereof wherein a further polarity inversion was necessarily imposed in another circuit, and it was convenient to compensate for such inversion in the demodulator. This accounts for the fact that in FIG. 3 the outputs of the I and Q demodulators in response to a phase shifted carrier are of opposite polarities.

The selector switch 50' in the output of the I demodulator 29 is electrically implemented in FIG. 5. It receives the same direct-current control signal on circuit 62 from the automatic gain control circuit 11 to indicate that pilot signal frequency is being received. The signal on circuit 62 is utilized in the selector switch 50' to trigger a monopulser 110, which has its binary ONE and ZERO outputs coupled to actuate input connections of two coincidence gates 111 and 112, respectively. The gate 111 is enabled by the binary ONE output of monopulser 110 when it is in its unstable operating condition and couples the output of the negative potential source through a logical OR gate 113 to the isolation amplifier 37. Gate 111 remains in the aforementioned operating condition as long as monopulser 110 is in its unstable operating condition in response to the initial reception of the pilot-detected signal. The monopulser has a time constant which corresponds to the duration of the interval of steady carrier and pilot in the start-up operation. Thereafter the monopulser resets to its stable operating condition, even though the pilot-detected signal continues to be present at its input connection during the remainder of the start-up operation, and during the data transmission which follows. While monopulser 110 is reset, its binary ZERO output operates coincidence gate 112 for coupling the output of the I demodulator 29 through OR gate 113 to the isolation amplifier 37.

The amplifier 37 is simply an emitter follower circuit which is normally biased approximately in the center of its operating range by a negative potential source 116 coupled to the base electrode of its transistor 117, and by a positive potential source 118 which is coupled to the emitter electrode of that transistor. The amplifier is utilized to present a high input impedance back through the selector switch circuits to the I demodulator 29 so that the phase control circuits of the demodulator do not load down the information signal path.

Each of the low-pass filters 33 and 38 includes a series resistor 119 and a shunt-connected capacitor 120 which are designed to have a cutoff frequency of approximately 25 cycles per second so that line frequency signals, i.e., information signals, in the demodulator output are rejected and only direct-current and low frequency alternating-current components adjacent to the zero frequency are pased by the low-pass filters. Transistors 121 and 122 are connected in further emitter follower circuits in the outputs of the low-pass filters for providing additional isolation. The emitter electrodes of transistors 121 and 122 are coupled to input connections of the nonlinear productor 36 and they are also coupled to the rectifier-slicers 43 and 42, respectively.

The productor 36 has an EXCLUSIVE OR type of function, as previously mentioned, and is adapted to operate as such a circuit in response to either direct-current input signals or alternating-current input signals. Two resistors 123 and 126 are connected in seires in the respective input connections of the productor for current limiting purposes to prevent the productor from loading down the inputs of the rectifier-slicer circuits 42 and 43. Shunt connected resistors 127 and 128 cooperate with a positive potential source 129 and a negative source 130, respectively, to provide compensation for transistor offset voltages in the various circuits supplying signals to the productor, as previously mentioned and as is well known in the art. The latter resistors and their respective potential sources are also adapted to compensate for such offset voltage effects produced by circuits within the productor. Sources 129 and 130 have different polarities reflecting the fact that in one application the offset compensation requirements were different on the two sides of the circuit. In either case, when the direct-current component in the output of the corresponding demodulator is zero the productor input transistor is based at its threshold of conduction.

Two transistors 131 and 132 are connected in the common emitter configuration, respectively, with their emitter electrodes grounded for supplying input signals to a further pair of transistors 133 and 136, which are arranged in an OR circuit configuration. The common collector output connection 137 of the transistors 133 and 136 is applied to the direction control input of the reversible binary counter 39.

The productor responds to the relative polarities of input signals applied thereto for producing the counter direction control signal. If one input connection is positive and the other negative, one input transistor, e.g., transistor 131, is biased to a nonconducting condition and the transistor 132, which receives the negative input signal, is biased into saturated conduction. Approximately ground potential appears at the collector electrode of transistor 132 and is coupled to the emitter electrode of transistor 136. Likewise, current flow from a positive potential source 138 toward that ground potential at the collector electrode of transistor 132 and through two resistors 139 and 140 imposes a positive bias upon the base electrode of transistor 133. Similar current flow from an additional positive potential source 141 through two resistors 142 and 143 toward the negative potential appearing at the collector electrode of the nonconducting transistor 131 places a negative potential on the base electrode of transistor 136 and a still more negative potential on the emitter electrode of transistor 133. Consequently, the latter transistor is biased to a non-conducting condition while transistor 136 is biased into saturated conduction to cause the lead 137 to be clamped to approximately ground potential. This ground potential is, for convenience of description, considered to be positive and causes the reversible counter to operate in the forward counting direction when pulses are received at its count input from the pulse generator.

It will be apparent that if the input polarity condition had been inverted so that transistor 132 were biased off and transistor 131 were biased on a similar operation of the productor would take place to produce a positive control signal on the lead 137, since the productor circuit configuration is symmertical about such output connection and between its respective input connections.

If, however, both input signals to the productor are of the same polarity, the operation is somewhat different. For positive inputs both of the transistors 131 and 132 are biased to the nonconducting condition, thereby placing the emitter electrodes of both transistors 133 and 136 at a negative potential level. Conduction from the sources 138 and 141 necessarily places the base electrodes of both of the latter transistors at more positive potentials than their emitter electrodes and causes the output circuit 137 to take on a negative potential of the source 146. Similarly, if both productor input signals were negative, both of the transistors 131 and 132 conduct and place the emitter electrodes of transistors 133 and 136 at approximately ground potential. Under these conditions the latter transistors are also necessarily biased to the nonconducting condition and output circuit 137 is placed at the negative potential of source 146.

The rectifier-slicer circuits 42 and 43 in FIG. 8, which are utilized for detecting low frequency demodulation output products of sufficient magnitude to warrant a supervisory examination of carrier phase condition, are essentially the same and the details of only one are illustrated in FIG. 8. A differential amplifier type of phase inverter is included in the input and receives signals from the emiter electrode of transistor 122. This circuit includes two transistors 147 and 148. The transistor 147 is normally biased for conduction by the cooperative bias circuits which couple its emitter electrode to a positive potential source 149 and its base electrode to a negative potential source 150 in the emitter follower circuit of transistor 122 in FIG. 5.

Transistor 148 is similarly normally biased for conduction by the bias circuits coupling its emitter electrode to the positive potential source 149 and by additional circuits coupling its base electrode to a tap 151 on a potential dividing resistor 152. The latter resistor is connected between a negative source 153 and a positive source 156 by a pair of diodes 157 and 158. The tap 151 is adjusted to provide the aforementioned normal conduction of transistor 148 in the absence of input signals, and also to adjust the characteristics of the phase inverting amplifier to provide symmetrical response for both positive and negative input signals. A rheostat 159 is connected between the emitter electrodes of transistors 147 and 148 separately from the aforementioned bias connections to those electrodes from the source 149. The rheostat is adjusted to vary the gain of the phase inverting amplifier and thereby determine the magnitude of an input signal which is required to actuate a diode bridge full wave rectifier 160 that has one set of diagonally opposite terminals thereof connected between the collector electrodes of transistors 147 and 148.

The other set of diagonally opposite terminals of bridge rectifier 160 are connected to the base electrodes of two transistors 161 and 162 which are of complementary conductivity types and which have their collector emitter circuits connected in series between a positive potential source 163 and a negative source 166. When the output signal from the phase inverting amplifier attains a sufficient total magnitude to drive the bridge rectifier 160 into conduction, both of the transistors 161 and 162 are biased into conduction. A ground signal appears at the collector electrode of transistor 162 and is coupled through the logical OR circuit 46 to enable the AND circuit 47 for coupling the output of the pulse generator 43 to the counting input of the reversible binary counter 39.

In the output of either demodulator 29 or 32 the breadth of the band of low frequencies which can cause carrier phase supervision is fixed by the combined effects of the corresponding one of low-pass filters 33 or 38, the setting of tap 151, and the threshold of bridge 160. The attenuation rolloff characteristics of the filters include a range of frequencies corresponding to amplitude changes in the multilevel signals through only a predetermined maximum number of adjacent amplitude levels. The thresholds in circuits 42 and 43 effect a sharper cutoff than is possible with practical filters. The twenty-five-cycle cutoff point mentioned before was found in one embodiment to provide satisfactory operation and was achieved by the cooperation of filter and threshold techniques.

Figure 7:
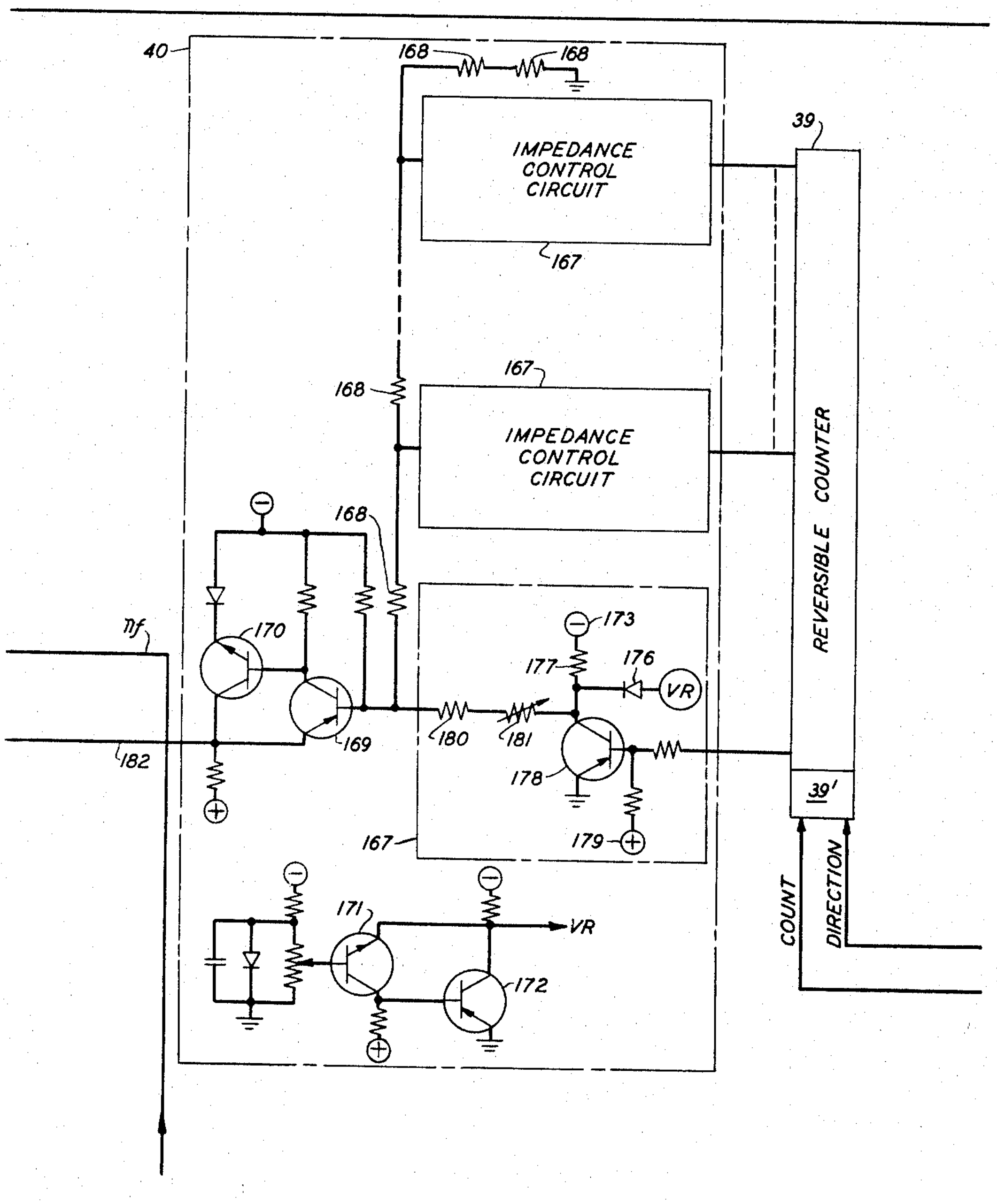

A single circuit 137 provides the direction control information to the reversible counter 39 in FIG. 7 although two such circuits were shown in FIG. 2 for schematic convenience to indicate separately the controls for up-and-down counting operations. Within the counter 39 conventional phase inverting circuitry, not shown, is utilized to derive a double-rail direction control signal from the circuit 137 for controlling counter operation. The internal structure of the counter is itself conventional. However, only the most significant stages are utilized for producing output signals to the digital-to-analog converter. Advantageously the two least significant stages, schematically represented by the block 39' appended to the lower end of the counter 39, are utilized to integrate out minor perturbations in counter operation due to noise of insignificant amplitude but which occasionally attains a sufficient magnitude to operate the rectifier-slicer circuits 42 or 43. In one embodiment, which was actually operated in a system having a 2400 c.p.s. carrier frequency, the reversible counter 39 had eleven stages and the nine most significant ones of those stages were utilized to provide outputs to the digital-to-analog converter 40. These nine binary counter stages provided 512 steps of adjustment which corresponded, in a 400 electrical degree range of phase control, to one step for every 0.78 electrical degree. This was found to provide adequate phase shift control for recovered carrier in a sixteen-level system wherein a 3-degree phase shift was found to close completely the multilevel eye pattern and produce an unacceptably high error rate.

The digital-to-analog converter 40 shown in FIG. 7 is one known in the art which has been found to operate satisfactorily in the present invention. The outputs from the reversible binary counter 39 are separately coupled to individual impedance control circuits 167 in the digital-to-analog converter 40. Each of the latter circuits is the same so the details of only one are illustrated. The impedance control circuits 167 control the current in the shunt branches of a ladder type impedance network which includes the series resistors 168 connected between ground and the input of a unity gain amplifier including two transistors 169 and 170. A reference voltage source including two transistors 171 and 172 provides a stable negative reference voltage VR to all of the control circuits 167.

Within a control circuit 167, the voltage VR cooperates with a considerably larger negative voltage source 173 to supply current to a potential divider including a diode 176 and a resistor 177 connected in series between the source VR and the source 173. Diode 176 is thus normally conducting and couples the voltage VR to the collector electrode of a transistor 178 which is arranged to be normally nonconducting in a common emitter circuit. A positive source 179 provides normal nonconducting bias to the base electrode of transistor 178, and that same electrode for each of the control circuits 167 is also coupled to receive a different output of the reversible counter 39. The counter drives the transistors 178 into conduction in different permutations and combinations in accordance with the binary counting condition of the counter. Each conducting transistor 178 clamps a corresponding shunt branch of the impedance network including resistors 180 and 181 to ground potential. Thus, each of the shunt branches of the over-all network is connectable, either to a negative voltage or to ground, depending upon the nature of the outputs of the binary counter.

The net potential developed at the base electrode of transistor 169 in the unity gain amplifier has a magnitude corresponding to the count level in the counter and this signal magnitude is coupled by a circuit 182 from the collector electrode of transistor 170 to the phase shifting circuit 22. Within the unity gain amplifier the transistor 170 provides current amplification and the transistor 169 provides feedback to improve the linearity of the amplifier response to the relatively wide variety of the input voltage amplitudes that must be coupled to the circuit 182 for representing the 512 different output count conditions from the binary counter 39.

The voltage on circuit 182 is applied to the phase shifter 22. In the latter circuit such voltage is coupled to each phase shifter stage through a decoupling network including a resistor 183 and a capacitor 186 which are adapted to make the control signal voltage available to each of a plurality of phase shifter stages without crosstalk voltage effects from one stage to another. The phase shifter stages are trigger circuits which are coupled together by time delay impedance networks and which have their triggering thresholds variably adjusted by means of the control signal on the circuit 182.

The phase shifter 22 includes an input common emitter amplifier stage having a transistor 187 which receives the carrier harmonic $nf_c$ at 9600 c.p.s. at its base electrode. The emitter electrode of transistor 187 is connected to ground so that the transistor is normally nonconducting in the absence of positive carrier harmonic pulses. The output from the collector electrode of transistor 187 is utilized to operate one stage of the phase shifter. Since all of the stages of the phase shifter are the same, only one is shown in FIG. 6. However, in one practical embodiment it was found that five stages of the type illustrated between the broken lines 188 and 189 in FIG. 6 were adequate to produce a 400-degree phase shift range for a 2400-cycle carrier signal wave.

The illustrated phase shifter stage is initially in a quiescent state in which transistors 190 and 191 are in their nonconducting conditions and 192 is conducting. A first capacitor 193 is charged to the terminal voltage of the output potential source in the preceding circuit stage which, in the illustrated case, is the source 196 in the emitter follower stage of transistor 187. An additional capacitor 197 is coupled across the collector and emitter electrodes of transistor 190 and is charged to the potential of a normalized potential terminal 198 which is connected to the collector electrodes of the transistors 190 in the other shift register stages. Terminal 198 receives its potential through a decoupling network including a capacitor 199 and an adjustable resistor 200.

A positive pulse in the 9600 c.p.s. signal wave biases transistor 187 into conduction and provides a rapid discharge path therethrough for the capacitor 193. The potential is developed across a diode 201 in the discharge path and is of the wrong polarity to bias transistor 190 into conduction. However, at the end of the positive pulse, transistor 187 reutrns to the nonconducting condition, and capacitor 193 charges toward the terminal voltage of the source 196 through the collector circuit resistor 202 of transistor 187 and through the base emitter-circuit of transistor 190, which is driven into conduction by the charging current. Transistor 190, during its conduction interval, provides a low impedance discharge path for the capacitor 197 for a measured time interval corresponding to the time constant of the capacitor 193 and the resistor 202. The potential at the base of transistor 191 is now lower than the threshold voltage so 191 is off and 192 is on. At the end of that interval there is insufficient charging current through the capacitor 193 to maintain conduction in transistor 190 and it is biased to the nonconducting condition. Capacitor 197 begins to charge through the collector circuit resistor 203 of transistor 190 and when a sufficient charge potential has been developed to exceed the control voltage from circuit 182 at the emitter electrode of transistor 191, that transistor is biased into conduction. The conduction of transistor 191 triggers the operation of a regenerative threshold detector circuit including the transistors 191 and 192. The conduction in transistor 191 causes transistor 192 to be driven into a nonconducting condition, thereby providing a positive transition to the input capacitor 193 of the next succeeding stage of the phase shifter.

When the transistor 192 of the last stage in the phase shifter has been biased off, the charging of a capacitor 206 biases a transistor 207 into conduction. The resulting negative-going signal at the collector electrode of transistor 207 is coupled to the input connections of the two bistable multivibrators 98 and 99 in multiple for accomplishing corresponding triggering operations therein. The total time delay of circuit 22 extends from the discharge of the first capacitor 193 to the conduction in transistor 207.

Thus, the low frequency energy components in the outputs of the two demodulators 29 and 32 are amplitude detected for supplying driving pulses to the reversible binary counter 39 for a time interval corresponding to the interval of duration of such products. The counter is operated in directions controlled by the output signal from the nonlinear productor 36, and the counter outputs are converted to a corresponding analog signal that controls the amount of phase shift to which the demodulation carrier harmonic is subjected. The reversible counter 39 remembers the phase shift condition prevailing at the end of an interval of supervision and retains that information until the beginning of a succeeding supervision interval regardless of how long that may be. The phase shifted carrier harmonic in the output of the phase shifter circuit 22 is divided down to the carrier frequency and utilized in the demodulators. The selector switch 50 is utilized in cooperation with the reference voltage source to eliminate the possibility of an ambiguous phase lock-up condition during demodulator initialization, and error control circuit outputs make it possible to eliminate a spuriously generated carrier phase inversion during data transmission.

Although the present invention has been described in connection with a particular embodiment thereof, additional embodiments and modifications, which will be apparent to those skilled in the art, are included within the spirit and scope of the invention.

What is claimed is:

1. In combination, a source of multilevel data signals modulated on a suppressed carrier wave, means supplying a local oscillation wave at the frequency of said suppressed carrier wave, first and second demodulators coupled to the output of said source, means supplying said local oscillation wave to said demodulators but in quadrature phase relationship at said second demodulator with respect to said first demodulator, first and second means deriving from the outputs of said demodulators, respectively, direct current and alternating current at low frequencies substantially below the frequency of said carrier wave, means coupled to both of said deriving means for producing a control signal having first and second magnitude output conditions as a function of leading or lagging phase error angle $\varphi_r$ between said local oscillation wave and the output of said source, means for shifting the phase of said local oscillation wave in a first or second direction which is a function of said control signal to reduce the magnitude of said angle $\varphi_r$, means actuating said shifting means in response to an output of a predetermined minimum magnitude from either of said deriving means, and means in said shifting means storing the last previous condition of said shifting means between actuations by said actuating means.

2. The combination in accordance with claim 1 in which said storing means comprises a reversible counter having first and second counting stages, said first stage being responsive to said last previous condition, said second stage being responsive to said first stage;

and means for coupling said second stage to said phase shifting means.

3. The combination in accordance with claim 2 in which said counter is adapted to operate said phase shifting means in steps of less than one electrical degree for said local oscillation wave.

4. The combination in accordance with claim 3 in which said shifting means comprises a digital-to-analog converter having a linear amplifier for coupling control signals in analog form from said counter to said phase shifting circuit.

5. In combination, a source of modulated signal trains having the modulation carrier frequency suppressed, said source supplying a train of initialization pulses prior to each signal train, means responsive to a control signal for generating a carrier frequency wave; said carrier frequency wave having a phase related to said control signal;

means responsive to said carrier frequency wave for demodulating said modulated signal trains;

means coupled to the output of said demodulation means for generating said control signal, and means responsive to said initialization pulses for applying a predetermined control signal to said generating means.

6. In combination, a source of modulated signals, means responsive to a control signal generating a carrier signal wave, said carrier signal wave having a phase dependent upon said control signal, means responsive to said carrier signal wave for demodulating said modulated signals, means coupled to the output of said demodulation means for generating said control signal;

error control means coupled to the output of said demodulation means for detecting data sequence errors, and means responsive to the detection of a predetermined minimum error rate inverting the phase of said carrier signal wave.

7. In combination, a source of amplitude modulated signals having the modulation carrier frequency suppressed, first and second demodulators coupled to the output of said source, means supplying a carrier frequency harmonic wave, a re-entrant shift register receiving said carrier frequency harmonic wave and producing two output oscillation waves at said carrier frequency and in phase quadrature relationship with respect to one another, means coupling said output waves from said shift register to said first and second demodulators, means deriving from said first demodulator a demodulated form of said signals, means coupled to the outputs of both of said demodulators for deriving a control signal having a magnitude which is a function of the direct-current and low frequency signal components in the outputs of said demodulators, and means receiving said control signal for shifting the phase of said carrier frequency harmonic to establish a predetermined phase relationship between said modulated signals and said shift register output which is coupled to said first demodulator.

8. In combination, a source of amplitude modulated signals having the modulation carrier frequency suppressed, first and second demodulators coupled to the output of said source, means supplying a carrier frequency harmonic wave, a re-entrant shift register receiving said carrier frequency harmonic wave and producing two symmetrical output oscillation waves at said carrier frequency and in phase quadrature relationship with respect to one another, means coupling said output waves from said shift register to said first and second demodulators, means deriving from said first demodulator a demodulated form of said signals, means coupled to the outputs of both of said demodulators for deriving a control signal having a magnitude which is a function of the direct-current and low frequency signal components in the outputs of said demodulators, and means receiving said control signal for shifting the phase of said carrier frequency harmonic wave to establish a predetermined phase relationship between said modulated signals and the output of said shift register which is coupled to said first demodulator.

9. A demodulator for multilevel amplitude modulated, suppressed carrier data signals, said demodulator comprising means deriving from said data signals two carrier frequency waves in quadrature phase relationship with respect to one another, an in-phase demodulator and a quadrature demodulator receiving said two carrier frequency waves, respectively, means applying said data signal to both said in-phase and said quadrature demodulators, means deriving demodulated data from the output of said in-phase demodulator only, two low-pass filters coupled to the respective outputs of said demodulators independently of said data deriving means, said filters having cut-off frequencies adapted to reject said carrier frequency, modulating means receiving the outputs of said filters for producing output signals having first and second amplitudes in response to first and second predetermined polarity relationships of the outputs of said filters, respectively, reversible counting means coupled to have the direction of counting operation thereof controlled by said modulating means output signal, a pulse generator, gating means responsive to outputs in excess of a predetermined minimum magnitude from either of said low-pass filters coupling pulses from said pulse generator to drive said counting means, and means responsive to the output of said counting means controlling the phase of said quadrature-related carrier frequency waves prior to application thereof to said demodulators, said phase controlling means being controllable by said counter through a range of phase adjustment which is significantly greater than 360 electrical degrees in said carrier frequency waves.

10. A demodulator for multilevel, amplitude modulated, suppressed carrier data signals, said demodulator comprising means supplying carrier signals followed by said data signals, means deriving from said data signals a control signal at a frequnecy which is equal to a predetermined harmonic $nf_c$ of the carrier frequency $f_c$ of such data signals, a re-entrant shift register receiving said harmonic control signal and producing therefrom a first output signal at said carrier frequency and a second output signal which is also at said carrier frequency but having a quadrature phase relation with respect to said first output signal, said first output signal having a phase error angle $\phi_r$ with respect to said data signals, an in-phase demodulator and a quadrature demodulator receiving said two carrier frequency waves, respectively, means applying said data signal to both said in-phase and said quadrature demodulators, means deriving demodulated data from the output of said in-phase demodulator only, two low-pass filters coupled to the respective outputs of said demodulators independently of said data deriving means, said filters having cut-off frequencies adapted to reject said carrier frequency, means receiving the outputs of said filters for producing output signals having either a first or a second polarity in response to the relative polarities of the outputs of said filters, said receiving means having an operating characteristic such that said output signals are a function of sine $\phi_r$ for direct current from at least one of said filters and a function of sine $2\phi_r$ for alternating current from both of said filters, reversible counting means coupled to have the direction of counting operation thereof controlled by said modulating means output signals, a pulse generator, gating means responsive to outputs in excess of a predetermined minimum magnitude from either of said low-pass filters coupling pulses from said pulse generator to drive said counter, means responsive to the output of said shift register controlling the phase of said quadrature-related carrier frequency waves prior to application thereof to said demodulators, said phase controlling means being controllable by said shift register through a range of phase adjustment which is significantly greater than 360 electrical degrees in said carrier frequency waves, means initially biasing said receiving means to produce an output as a function of sine $\phi_r$ in response to said carrier signals from said supplying means, means detecting pattern errors in said demodulated data, and means rseponsive to a predetermined pattern of detected errors inverting the phases of each of said register first and second outputs.

11. In combination, means supplying modulated signals with modulation carrier suppressed, said signals having a plurality of information-determinant levels, means supplying a carrier frequency wave, demodulation means coupled to both of said supplying means for demodulating said signals, filter means coupled to the output of said demodulation means and adapted to pass direct current and low frequencies while rejecting higher frequencies including said carrier frequency, said filter means having an attenuation rolloff characteristic in a frequency range corresponding to amplitude changes in said signal through only a predetermined maximum number, less than all, of adjacent ones of said signal levels, an amplitude threshold circuit coupled to the output of said filter means and including means for adjusting the threshold thereof to reject a selectable range of amplitudes in said rolloff characteristic thereby sharply defining the frequency components coupled to the output thereof, means selectively operable for controlling the phase of said carrier frequency wave, and means coupling the output of said threshold circuit to said phase controlling means for selectively operating such means.

12. In combination, a source of signals modulated on a suppressed carrier wave, means supplying a local oscillation wave at the frequency of said suppressed carrier wave, first and second demodulators coupled to the output of said source, means supplying said local oscillation wave to said demodulators but in quadrature phase relationship at said second demodulator with respect to said first demodulator, means deriving from the outputs of both of said demodulators direct current and low frequency alternating currents which have a relative polarity relationship that is a function of the leading or lagging polarity of the phase error angle between said local oscillation wave and the output of said source, means coupled to said deriving means for producing a control signal having an amplitude condition which is a function of the leading or lagging nature of said phase error angle $\varphi_r$, and means responsive to said control signal shifting the phase of said local oscillation wave to reduce the magnitude of said phase error angle, said shifting means having a shifting range of greater than 360 electrical degrees of said local oscillation wave and having an operating characteristic such that a significant time interval is required to change operation from one extreme to the other of said range.

13. In combination, a source of multilevel data signals modulated on a suppressed carrier wave, means supplying a local oscillation wave at the frequency of said suppressed carrier wave, first and second demodulators coupled to the output of said source, means supplying said local oscillation wave to said demodulators but in quadrature phase relationship at said second demodulator with respect to said first demodulator, first and second means deriving from the outputs of said demodulators, respectively, direct current and alternating current at frequencies substantially below the frequency of said carrier wave, means coupled to both of said deriving means for producing a control signal having a magnitude condition which is a function of the product of the outputs of said deriving means, means for shifting the phase of said local oscillation wave in a direction which is a function of said control signal, and means actuating said shifting means in response to an output of a predetermined minimum magnitude from either of said deriving means.

14. The combination in accordance with claim 13 in which said phase shifting means comprises:

a first transistor, having a base, an emitter and a collector, means biasing said transistor into conduction for a time interval of predetermined duration in response to each cycle of said wave, a capacitor connected between said emitter and said collector of said transistor, and a regenerative threshold detector responsive to said control signal coupled to said capacitor for triggering in response to a charge potential across said capacitor of predetermined magnitude.

15. In combination, means producing multilevel signals wherein plural predetermined positive and negative signal amplitude levels each represent different information characteristics, said signals being amplitude modulated on a carrier wave of predetermined frequency, means deriving a carrier frequency signal wave from said multilevel signals, separate in-phase and quadrature demodulators receiving said wave and said signals, first and second filter means coupled, respectively, to the outputs of said demodulators and adapted to pass demodulator output energy components ranging in frequency from direct current to a predetermined frequency below said carrier frequency, means actuatable to adjust the phase of said carrier frequency signal wave as a function of the polarities of the outputs of said filters, first and second threshold circuits coupled respectively to the outputs of said first and second filters, each of said threshold means being adapted to produce an output signal in response to only a predetermined portion of the output amplitude from said filters, and means responsive to an output from either of said threshold means actuating said phase adjusting means.

16. In combination, means receiving multilevel data signals, means supplying an oscillation wave, means coupled to said receiving means and to said supplying means demodulating said signals, said demodulating means including means controlling the phase relationship between said wave and said signals as a function of low frequency output components of said demodulating means, means coupled to the output of said demodulating means for detecting pattern errors in said signals and producing an indication in response to the detection of errors in excess of a predetermined minimum error rate, and means responsive to a predetermined minimum number of said error indications coupled to said phase controlling means for inverting the phase of said wave.

17. In combination, means responsive to a control signal for providing first and second carrier waves, said first carrier wave being at the same frequency and in phase quadrature with said second carrier wave;

a first means responsive to a phase relationship between said first carrier wave and a received modulated signal for deriving an information signal therefrom;

a second means responsive to a phase relationship between said second carrier wave and said received modulated signal for providing said control signal;

means responsive to a first enabling signal for applying said control signal to said carrier wave providing means; and means responsive to said information signal for providing said first enabling signal.

18. A combination as defined in claim 17 wherein said enabling signal responsive means is also responsive to a second enabling signal for applying said control signal to said carrier wave providing means; and means responsive to a predetermined amplitude of said control signal for providing said second enabling signal.

19. In combination, means responsive to a control signal for providing first and second carrier waves, said first carrier waves being at the same frequency and in phase quadrature with said second carrier wave;

a first means responsive to a phase relationship between said first carrier wave and a received modulated signal for deriving an information signal therefrom;

a second means responsive to a phase relationship between said second carrier wave and said received modulated signal for providing a quadrature signal;

means responsive to the relative polarity of said information signal and said quadrature signal for providing said control signal.

20. The combination as defined in claim 19 in which means responsive to an enabling signal applies said control signal to said carrier wave providing means; and means are included responsive to said information signal for providing said enabling signal.

21. The combination as defined in claim 19 also including, means responsive to said information signal for detecting errors therein and producing an indication in response to an error rate in excess of a predetermined value for providing an error signal; and means responsive to said error signal for inverting the phase of said first and second carrier waves.

References Cited

UNITED STATES PATENTS

| | | | |
|---|---|---|---|
| 2,924,706 | 2/1960 | Sassler | 325—329 |
| 2,938,114 | 5/1960 | Krause | 325—329 |
| 2,999,155 | 9/1961 | Masonson | 325—329 |
| 3,048,782 | 8/1962 | Altman | 325—329 XR |
| 3,101,448 | 8/1963 | Costas | 325—329 XR |
| 3,286,183 | 11/1966 | Bergemann | 325—329 |

KATHLEEN H. CLAFFY, *Primary Examiner.*

R. S. BELL, *Assistant Examiner.*

U.S. Cl. X.R.

325—49; 332—44